United States Patent
Hedrick

(10) Patent No.: US 6,740,227 B2
(45) Date of Patent: May 25, 2004

(54) STRIPPING PROCESS WITH FULLY DISTRIBUTED OPENINGS ON BAFFLES

(75) Inventor: Brian W. Hedrick, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 180 days.

(21) Appl. No.: 09/746,751

(22) Filed: Dec. 21, 2000

(65) Prior Publication Data

US 2002/0008052 A1 Jan. 24, 2002

Related U.S. Application Data

(60) Provisional application No. 60/173,606, filed on Dec. 29, 1999.

(51) Int. Cl.[7] ............................................. C10G 11/00
(52) U.S. Cl. ...................... 208/113; 208/150; 422/139; 422/140; 422/144; 422/147
(58) Field of Search ................................ 208/150, 113; 422/139, 140, 144, 147

(56) References Cited

U.S. PATENT DOCUMENTS

| | | | |
|---|---|---|---|
| 2,440,620 A | 4/1948 | Taff | 23/288 |
| 2,472,502 A | 6/1949 | Tyson | 23/288 |
| 2,541,801 A | 2/1951 | Wilcox | 196/52 |
| 2,612,438 A | 9/1952 | Murphree | 23/288 |
| 2,994,659 A | 8/1961 | Slyngstad et al. | 208/113 |
| 3,894,932 A | 7/1975 | Owen | 208/74 |
| 4,364,905 A | 12/1982 | Fahrig et al. | 422/144 |
| 4,414,100 A | 11/1983 | Krug et al. | 208/153 |
| 4,481,103 A | 11/1984 | Krambeck et al. | 208/120 |
| 4,500,423 A | 2/1985 | Krug et al. | 208/161 |
| 5,015,363 A | * 5/1991 | Cetinkaya | 208/150 |
| 5,474,669 A | * 12/1995 | Cetinkaya | 208/150 |
| 5,531,884 A | * 7/1996 | Johnson et al. | 208/150 |
| 5,549,814 A | * 8/1996 | Zinke | 208/150 |

FOREIGN PATENT DOCUMENTS

| | | |
|---|---|---|
| GB | 2233663 A | 1/1991 |
| WO | WO 91/00899 A1 | 1/1991 |

* cited by examiner

Primary Examiner—Walter D. Griffin
Assistant Examiner—James Arnold, Jr.
(74) Attorney, Agent, or Firm—John G. Tolomei; James C. Paschall

(57) ABSTRACT

A baffle-style stripper for an FCC process having a complete or nearly complete coverage of stripping openings over the sloped surface of the baffle will provide improved stripping efficiency and catalyst flux through the stripper. The complete distribution of relatively small openings over the entire surface of a sloped baffle has been found to interrupt relatively dense streamers of catalyst that were previously not known to exist and which short-circuited the contact of the stripping fluid with the catalyst. Spreading out the stripping gas across the sloped area of the baffle to a much greater extent than has been practiced in the past has now been found to promote active contacting of the catalyst with the stripping fluid over the entire volume of the stripper between the baffles.

27 Claims, 5 Drawing Sheets

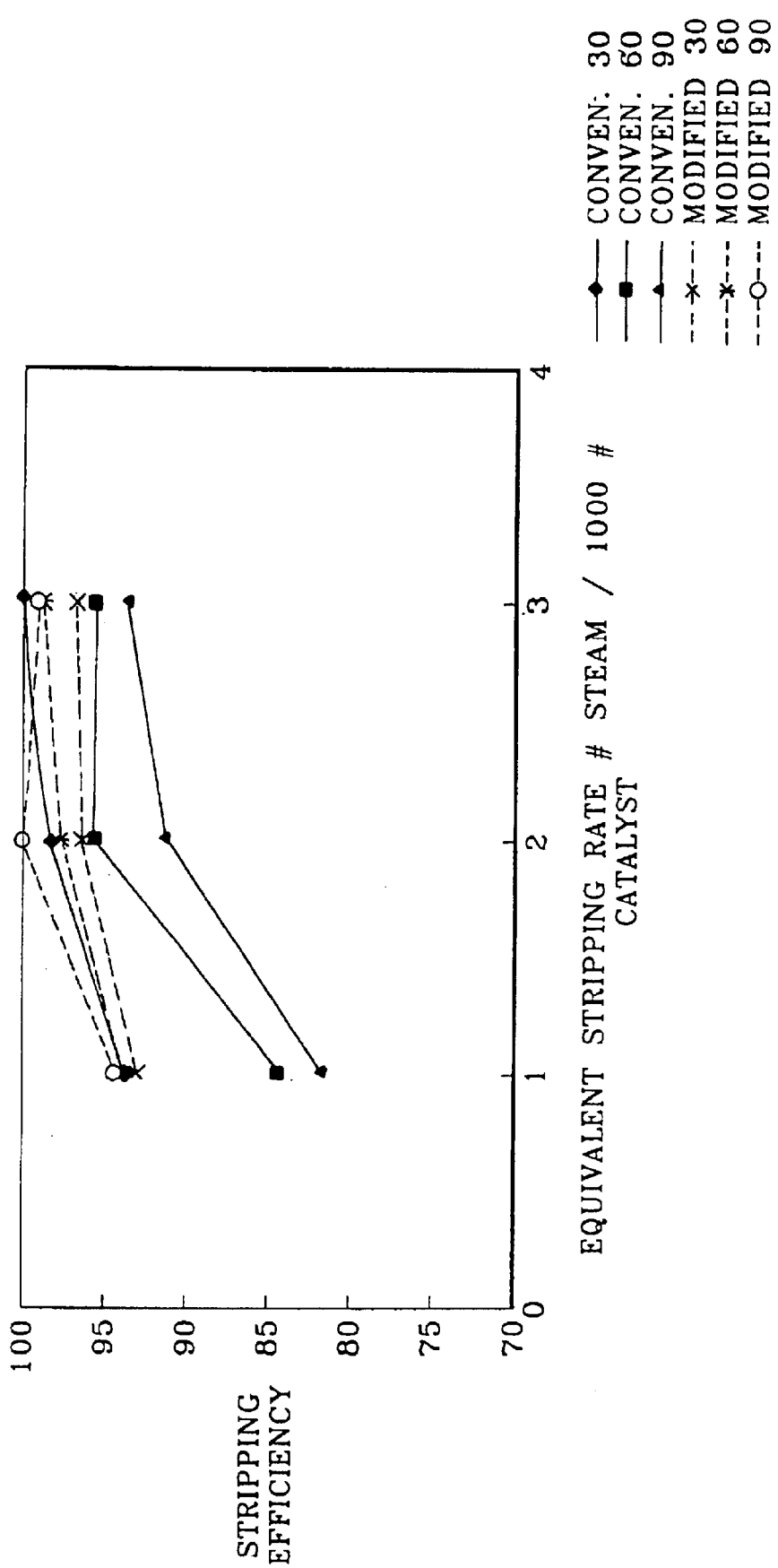

STRIPPING PROCESS WITH FULLY DISTRIBUTED OPENINGS ON BAFFLES

CROSS-REFERENCE TO RELATED APPLICATION

This application claims priority from Provisional Application Serial No. 60/173,606 filed Dec. 29, 1999, the contents of which are hereby incorporated by reference.

BACKGROUND OF THE INVENTION

1. Field of the Invention

This invention relates to processes and apparatus for the fluidized contacting of catalyst with hydrocarbons. More specifically, this invention relates to the processes and apparatus for stripping entrained or adsorbed hydrocarbons from catalyst particles.

2. Description of the Prior Art

A variety of processes contact finely divided particulate material with a hydrocarbon containing feed under conditions wherein a fluid maintains the particles in a fluidized condition to effect transport of the solid particles to different stages of the process. Catalyst cracking is a prime example of such a process that contacts hydrocarbons in a reaction zone with a catalyst composed of finely divided particulate material. The hydrocarbon feed fluidizes the catalyst and typically transports it in a riser as the catalyst promotes the cracking reaction. As the cracking reaction proceeds, substantial amounts of coke are deposited on the catalyst. A high temperature regeneration within a regeneration zone burns coke from the catalyst by contact with an oxygen-containing stream that again serves as a fluidization medium. Coke-containing catalyst, referred to herein as spent catalyst, is continually removed from the reaction zone and replaced by essentially coke-free catalyst from the regeneration zone. Fluidization of the catalyst particles by various gaseous streams allows the transport of catalyst between the reaction zone and regeneration zone. Methods for cracking hydrocarbons in a fluidized stream of catalyst, transporting catalyst between reaction and regeneration zones, and combusting coke in the regenerator are well known to those skilled in the art of FCC processes. To this end, the art is replete with vessel configurations for contacting catalyst particles with feed and regeneration gas, respectively.

A majority of the hydrocarbon vapors that contact the catalyst in the reaction zone are separated from the solid particles by ballistic and/or centrifugal separation methods within the reaction zone. However, the catalyst particles employed in an FCC process have a large surface area, which is due to a great multitude of pores located in the particles. As a result, the catalytic materials retain hydrocarbons within their pores and upon the external surface of the catalyst. Although the quantity of hydrocarbons retained on each individual catalyst particle is very small, the large amount of catalyst and the high catalyst circulation rate which is typically used in a modern FCC process results in a significant quantity of hydrocarbons being withdrawn from the reaction zone with the catalyst.

Therefore, it is common practice to remove, or strip, hydrocarbons from spent catalyst prior to passing it into the regeneration zone. It is important to remove retained hydrocarbons from the spent catalyst for process and economic reasons. First, hydrocarbons that enter the regenerator increase its carbon-burning load and can result in excessive regenerator temperatures. Stripping hydrocarbons from the catalyst also allows recovery of the hydrocarbons as products. Avoiding the unnecessary burning of hydrocarbons is especially important during the processing of heavy (relatively high molecular weight) feedstocks, since processing these feedstocks increases the deposition of coke on the catalyst during the reaction (in comparison to the coking rate with light feedstocks) and raises the combustion load in the regeneration zone. Higher combustion loads lead to higher temperatures which at some point may damage the catalyst or exceed the metallurgical design limits of the regeneration apparatus.

The most common method of stripping the catalyst passes a stripping gas, usually steam, through a flowing stream of catalyst, counter-current to its direction of flow. Such steam stripping operations, with varying degrees of efficiency, remove the hydrocarbon vapors which are entrained with the catalyst and adsorbed on the catalyst. Contact of the catalyst with a stripping medium may be accomplished in a simple open vessel as demonstrated by U.S. Pat. No. 4,481,103.

The efficiency of catalyst stripping is increased by using vertically spaced baffles to cascade the catalyst from side to side as it moves down a stripping apparatus and counter-currently contacts a stripping medium. Moving the catalyst horizontally increases contact between the catalyst and the stripping medium so that more hydrocarbons are removed from the catalyst. In these arrangements, the catalyst is given a labyrinthine path through a series of baffles located at different levels. Catalyst and gas contact is increased by this arrangement that leaves no open vertical path of significant cross-section through the stripping apparatus. Further examples of these stripping devices for FCC units are shown in U.S. Pat. No. 2,440,620, U.S. Pat. No. 2,612,438, U.S. Pat. No. 3,894,932, U.S. Pat. No. 4,414,100 and U.S. Pat. No. 4,364,905. These references show the typical stripper arrangement having a stripper vessel, a series of outer baffles in the form of frusto-conical sections that direct the catalyst inwardly onto a series of inner baffles. The inner baffles are centrally located conical or frusto-conical sections that divert the catalyst outwardly onto the outer baffles. The stripping medium enters from below the lower baffles and continues rising upwardly from the bottom of one baffle to the bottom of the next succeeding baffle. Variations in the baffles include the addition of skirts about the trailing edge of the baffle as depicted in U.S. Pat. No. 2,994,659 and the use of multiple linear baffle sections at different baffle levels as demonstrated in FIG. 3 of U.S. Pat. No. 4,500,423. A variation in introducing the stripping medium is shown in U.S. Pat. No. 2,541,801 where a quantity of fluidizing gas is admitted at a number of discrete locations.

It is an objective of any new stripping design to minimize the addition of stripping medium while maintaining the benefits of good catalyst stripping throughout the FCC process unit. In order to achieve good stripping of the catalyst with the resultant increased product yield and enhanced regenerator operation, relatively large amounts of stripping medium have been required. For the most common stripping medium, steam, the average requirement throughout the industry is about 2 lbs. of steam per 1000 lbs. (2.0 kg of steam per 1000 kg) of catalyst for catalyst stripping. In the case of steam, the costs include capital expenses and utility expenses associated with supplying the steam and removing the resulting water via downstream separation facilities. Where there is not adequate supply or treatment capacity, the costs associated with raising the addition of stripping medium can be significant. In such cases achieving better stripping without an increase in the required steam will yield substantial economic benefits to the FCC process.

However, better stripping brings more important economic benefits to the FCC process by reducing coke production. Reducing coke production permits a lowering of the regenerator temperature so that the reaction may operate at a higher catalyst-to-oil (C/O) ratio. The higher C/O increases conversion and increases the production of valuable products. A stripping operation that reduces the production of coke by 0.05 wt-% can lower regenerator temperature by 15° to 20° F. (−9° to −7° C.) and permit a C/O ratio increase in the range of 6%. The corresponding improvement in conversion yields 0.6 to 0.7 vol-% more gasoline as well also increasing the yield of desired light products. Therefore, it is a further objective of this invention to decrease coke production by more efficient catalyst stripping.

Moreover, it is not possible to simply increase stripping efficiency or capacity by accepting the economic penalties associated with the use of increasing amounts of steam. At some point, the typical stripper that operates with baffles becomes limited by the amount of catalyst flux moving through the stripper. A practical limit on catalyst flux for operating such strippers is approximately 90,000 lbs/hr/ft$^2$ (439,380 kg/hr/m$^2$) based on total stripper area. Attempts have been made to increase the capacity and effectiveness of stripping in a baffle-style stripping unit by modifying the configuration and area of the baffles. U.S. Pat. No. 5,531,884 shows a modification to a baffle-style stripper that incorporates one or more rings of large vertical conduits to provide an additional catalyst and gas circulation path across the baffles. It is also known to concentrate opening in a very centralized portion of the stripping baffles.

BRIEF SUMMARY OF THE INVENTION

It has now been found that providing a baffle-style stripper with a complete or nearly complete coverage of stripping openings over the sloped surface of the baffle will provide improved stripping efficiency and catalyst flux through the stripper. It was also unexpectedly found that the stripper efficiency increases with higher catalyst flux when using the modified baffles of this invention. The complete distribution of relatively small openings over the entire surface of a sloped baffle has been found to interrupt relatively dense streamers of catalyst that were previously unrecognized to exist and which short-circuited the contact of the stripping fluid with the catalyst. The presence of these streamers would permit the catalyst to take the shortest possible path across the sloped surface of the baffle from the point where the catalyst first contacts the stripper baffle to the point where catalyst exits the bottom of the baffle. This flow pattern leaves large areas of the stripper inactive and containing dense slumped catalyst. Spreading out the stripping gas across the sloped area of the baffle to a much greater extent than has been practiced in the past has now been found to promote active contacting of the catalyst with the stripping fluid over the entire volume of the stripper between the baffles. As an added benefit more complete coverage by the stripper opening also prevents choking of stripper flow by the restriction of stripping gas flow to narrow open areas between the sloped baffles. By this discovery, previous limits for typical baffle-type stripper throughput may be increased by as much as 50%. The process of this invention has particular benefits at flux rates of at least 90,000 lbs/hr/ft$^2$ (439,380 kg/hr/m$^2$) of stripper area and is particularly useful at flux rates over 120,000 lbs/hr/ft$^2$ (585,840 kg/hr/m$^2$) of stripper area and even over 140,000 lbs/hr/ft$^2$ (683,480 kg/hr/m$^2$) of stripper area.

Accordingly, it is an object of this invention to increase the maximum capacity at which a baffle-style stripper may operate.

It is another object of this invention to increase the efficiency of stripping in a baffle style stripper.

It is a further object of this invention to obtain a method and apparatus that provides a more complete utilization of stripping medium.

While not wishing to be bound to any theory, it is believed that relatively small openings on the order of 1.5 inches (3.8 cm) or less distributed to cover essentially the entire sloped baffle surface effect better stripping than larger, less dispersed openings that leave greater areas of the sloped baffle surface without openings for the fluidization medium. Smaller diameters minimize the length of jet penetration of the fluidization medium into the catalyst on the surface of the baffle. Since it is believed that mass transfer takes place in the zone around the jet and the bubble of gas formed by the jet, the most effective stripping should occur when the small jets create relatively small gas bubbles and provide greater interactive surface between the gas and the catalyst that it contacts. Smaller openings and resulting smaller bubble creation complements the concept of more opening dispersal to avoid any areas over the baffle surface that may be bypassed by the streamers of catalyst.

Larger hole sizes tend to create large jets of gas from the distribution holes. Long jet penetration into the catalyst above the baffle has the disadvantage of creating relatively large bubbles as the jet dissipates while also bypassing catalyst due to the high jet velocity and delaying the dissipation of gas bubbles that increases the contacting of the gas with the catalyst. Preferred holes for this arrangement have diameters ranging from 0.38 to 0.75 inch (1 to 1.9 cm), with smaller diameters being preferred for the purposes of gas and catalyst contacting. However, decreasing hole diameter has the disadvantage of increasing the possibility of hole plugging by catalyst, refractory or scale blockage in the hole. As a result, holes in a range of from 0.5 to 0.75 inch (1.3 to 1.9 cm) are particularly preferred as a compromise between minimizing jet length while avoiding plugging of the holes.

This invention uses a much greater dispersal of holes over the entire sloped surface of the baffle than has been employed in the past. The holes emit stripping gas that accumulates in the pocket formed by the underside of the sloped baffle. Distribution of the holes over the entire sloped surface means the elimination of the previous large areas that were left without fluidizing gas perforations. At a minimum, the distribution of the openings over the sloped surface will provide at least one opening for each square foot (0.09 square meter) of the sloped surface of each baffle. Preferably, this invention will eliminate any large unperforated areas of the sloped surface by minimizing areas that do not contain any perforations. One measure of eliminated unperforated areas will provide a baffle perforation pattern wherein subdivision of any portion of the sloped surface into a circular area of at least 1 ft$^2$ (0.09 m$^2$) will surround at least a portion of one or more openings in that area. Another measure of substantially complete distribution of perforations on the sloped surface has perforations within at least 8 inches (20.3 cm) of an adjacent perforation, preferably within 6 inches (15.2 cm) of an adjacent perforation and more preferably within 4 inches (10.2 cm) of an adjacent perforation. Furthermore, it is preferable to eliminate any large areas of unperforated sloped baffle surface at the top or the bottom of the baffles. One measure of eliminating these areas that were created by past hole distributions places a perforation within at least 6 inches (15.2 cm) of either the top or bottom baffle edge.

In addition, the distribution of holes across the baffle need not be uniform. The sloped surface of the baffle creates a higher differential pressure across the sloped surface of the baffle as the elevation of the holes along the sloped surface increases. Accordingly, a uniform distribution of the uniformly sized holes across the baffle will provide a greater volume of gas delivery across the higher elevations of individual baffles due to the greater jet length associated with the greater pressure differential. Therefore, as long as the baffle is sloped, a uniform volumetric delivery of gas over the baffle surface requires an increase in distribution hole area toward the lower part of the baffle. It is preferred that in high catalyst flux applications, in the range of 90,000 lbs/hr/ft$^2$ (439,380 kg/hr/m$^2$) or greater, the hole distribution pattern provides an even volumetric gas delivery across the sloped surface of the baffle. Such delivery can be provided by biasing the percentage of open hole area toward the lower part of the baffle. The open hole area may be increased by using a greater percentage of holes, larger holes, or both, in the lower baffle portion.

Even for applications where the catalyst flux through the stripping zone is relatively lower, the hole distribution arrangement of this invention still provides substantial benefits. However, for lower flux applications which typically refer to a flux below 90,000 lbs/hr/ft$^2$ (439,380 kg/hr/m$^2$) of stripper area, the catalyst flow across the stripping baffles tends to be greatest towards the lower portion of the baffles. Accordingly, a biasing of the gas flow towards the lower portion of the baffle can particularly benefit low catalyst flux applications. In such cases, it may be beneficial to increase the volume of open hole area towards the lower portion of the baffle beyond that which would provide a uniform volumetric gas delivery across the baffle such that a greater volumetric delivery of gas occurs over the lower portion of the sloped baffle.

We also found that setting stripping baffles at angles of 30° and 60° operated with comparable efficiency and sometimes better efficiency than baffles operated at angles of 45°, all incorporating the improved hole distribution of the present invention. Hence, baffle angles of 30° may be preferable to baffle angles of 45° or 60° because more baffles can be assembled in a given height of stripping column and because there is lower pressure differential across the baffle oriented at shallower angles. Moreover, at a 30° baffle angle, high efficiency was observed for flux rates as high as 140,000 lbs/hr/ft$^2$ (683,480 kg/hr/m$^2$) of catalyst.

In a broad embodiment, this invention is a process for the stripping of entrained and/or adsorbed hydrocarbons from particulate material. The process contacts particles with a hydrocarbon stream and disengages the hydrocarbons from the particles after contact with the hydrocarbon stream to produce a stream of contacted particles containing entrained or adsorbed hydrocarbons. The contacted particles pass downwardly through a plurality of sloped stripping baffles. A plurality of openings distributed over the entire sloped surface of each stripping baffle discharge stripping fluid upwardly through the baffle to strip hydrocarbons from the particulate material that passes over the top of the baffle. The arrangement of baffle openings provides at least one opening for each square foot (0.09 square meter) of the baffle sloped surface. The process recovers stripping fluid, stripped hydrocarbons, and stripped particles from the stripping baffles.

In a more limited embodiment, this invention is a process for the stripping of entrained and/or adsorbed hydrocarbons from particulate material where the entrained or adsorbed hydrocarbons are from the fluidized catalytic cracking (FCC) of an FCC feed with a particulate material comprising an FCC catalyst. The process contacts an FCC feed with FCC catalyst to provide a mixture of catalyst and feed and to convert the FCC feed while depositing coke on the FCC catalyst. Disengagement of the converted FCC feed from the FCC catalyst produces a stream of disengaged catalyst particles containing entrained or adsorbed hydrocarbon. The disengaged catalyst particle stream passes into a stripping zone and downwardly through a plurality of vertically sloped stripping baffles located in the stripping zone. A plurality of openings distributed over the entire sloped surface of each stripping baffle discharge stripping fluid upwardly across the baffle to strip hydrocarbons from the FCC catalyst that passes over the top of the baffle. The arrangement of baffle openings provides at least one opening for each square foot (0.09 square meter) of the baffle sloped surface. The process recovers stripping fluid and stripped hydrocarbons that pass upwardly from the stripping baffles and stripped FCC catalyst that passes downwardly from the stripping baffles. Stripped FCC catalyst passes to a regeneration zone to remove coke from the FCC catalyst. FCC catalyst from the regeneration zone is returned for contact with the FCC feed.

In an apparatus embodiment, this invention comprises a stripper arrangement for the stripping of entrained and/or adsorbed hydrocarbons from particulate material. The apparatus comprises a stripping vessel defining at least one port for receiving particles that contain entrained or adsorbed hydrocarbons from the contact of the particles with a hydrocarbon stream and for withdrawing stripping fluid and stripped hydrocarbons from the stripping vessel. A plurality of sloped stripping baffles are spaced apart vertically over at least a portion of the stripping vessel height with each baffle having a sloped surface and each sloped surface having a transverse projection equal to at least one-third of the minimum transverse cross-section of the stripping vessel at that baffle location. A plurality of openings distributed over the entire sloped surface of each stripping baffle provide at least one opening for each square foot (0.09 square meter) of the sloped surface. The openings are preferably provided within 9 inches (23 cm) of the edge of any baffle and more preferably within 6 inches (15 cm) of the edge of any baffle. The stripper includes at least one fluid inlet that passes a stripping fluid to the underside of one or more stripping baffle for stripping hydrocarbons from the particulate material. The stripping vessel also includes at least one particle outlet for recovering stripped particles from the stripping baffles. The port at the top of the stripping vessel will ordinarily serve as an inlet receiving particles and an outlet for withdrawing stripping gas and stripping fluid. However, separate inlets and outlets may be employed, in particular a separate inlet may be provided for passing the hydrocarbon containing catalyst into the stripper vessel.

Additional objects, embodiments, and details of this invention are given in the following detailed description of the invention.

BRIEF DESCRIPTION OF THE DRAWINGS

FIG. 9 is a graph of the data comparing traditional baffle performance with the modified baffles of this invention.

DETAILED DESCRIPTION OF THE INVENTION

Figure 1:
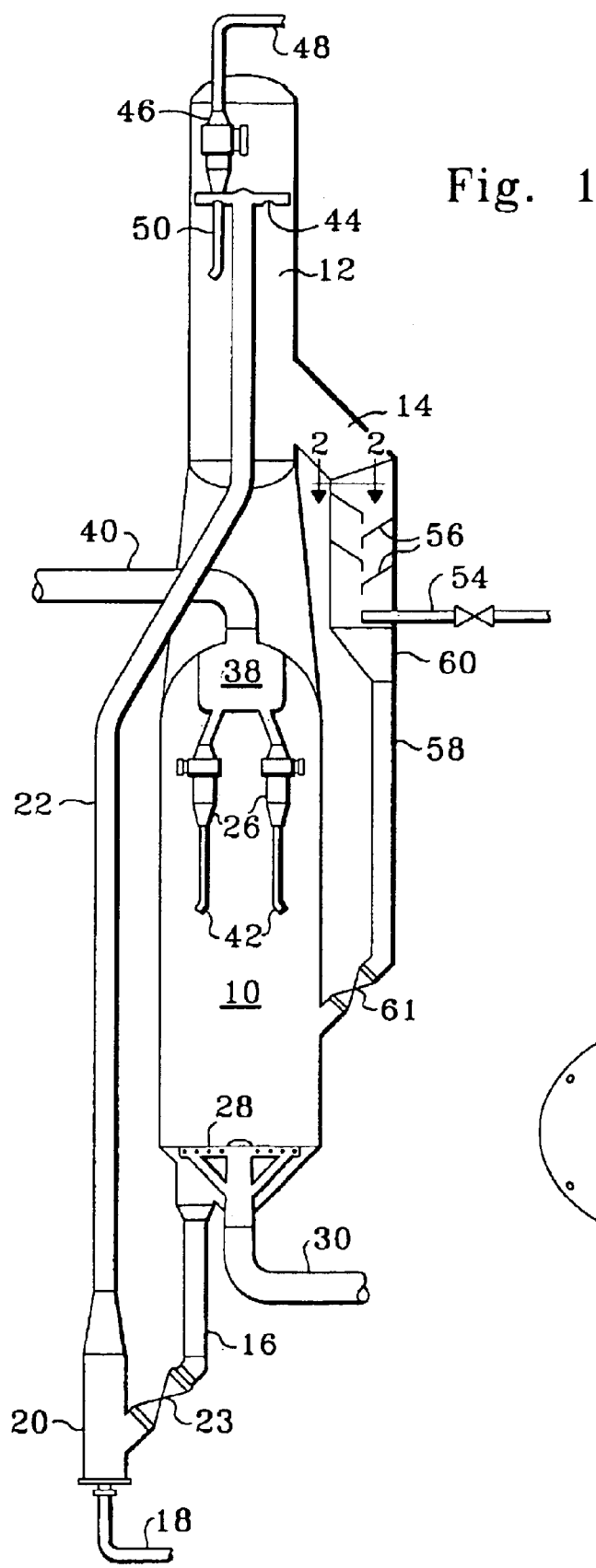
FIG. 1 is representative of the prior art and shows a schematic, sectional elevation view of a stacked FCC regenerator-reactor and stripper arrangement.

Looking first at a more complete description of the FCC process, the typical feed to an FCC unit is a gas oil such as a light or vacuum gas oil. Other petroleum-derived feed streams to an FCC unit may comprise a diesel boiling range mixture of hydrocarbons or heavier hydrocarbons such as reduced crude oils. It is preferred that the feed stream consist of a mixture of hydrocarbons having boiling points, as determined by the appropriate ASTM test method, above about 446° F. (230° C.) and more preferably above about 554° F. (290° C.). It is becoming customary to refer to FCC-type units which are processing heavier feedstocks, such as atmospheric reduced crudes, as residual crude cracking units, or resid cracking units. The process and apparatus of this invention can be used for either FCC or residual cracking operations. For convenience, the remainder of this specification will only make reference to the FCC process.

An FCC process unit comprises a reaction zone and a catalyst regeneration zone. In the reaction zone, a feed stream is contacted with a finely divided fluidized catalyst maintained at an elevated temperature and at a moderate positive pressure. In this invention, contacting of feed and catalyst usually takes place in a riser conduit, but may occur in any effective arrangement such as the known devices for short contact time contacting. In the case of a riser, it comprises a principally vertical conduit as the main reaction site, with the effluent of the conduit emptying into a large volume process vessel, which is called the reactor vessel or may be referred to as a separation vessel. The residence time of catalyst and hydrocarbons in the riser needed for substantial completion of the cracking reactions is only a few seconds or less. The flowing vapor/catalyst stream leaving the riser may pass from the riser to a solids-vapor separation device located within the separation vessel or may enter the separation vessel directly without passing through an intermediate separation apparatus. When no intermediate apparatus is provided, much of the catalyst drops out of the flowing vapor/catalyst stream as the stream leaves the riser and enters the separation vessel. One or more additional solids/vapor separation devices, almost invariably a cyclone separator, is normally located within and at the top of the large separation vessel. The products of the reaction are separated from a portion of catalyst which is still carried by the vapor stream by means of the cyclone or cyclones and the vapor is vented from the cyclone and separation zone. The spent catalyst falls downward to a lower location within the separation vessel. A stripper is usually located near a lower part of the reactor vessel to remove hydrocarbons from the catalyst and comprises a stripper vessel separate from the riser and reactor vessel. Catalyst is transferred to a separate regeneration zone after it passes through the stripping apparatus.

The rate of conversion of the feedstock within the reaction zone is controlled by regulation of the temperature, activity of the catalyst, and quantity of the catalyst (i.e., catalyst-to-oil ratio) maintained within the reaction zone. The most common method of regulating the temperature in the reaction zone is by regulating the rate of circulation of catalyst from the regeneration zone to the reaction zone, which simultaneously changes the catalyst-to-oil ratio. That is, if it is desired to increase the conversion rate within the reaction zone, the rate of flow of catalyst from the regeneration zone to the reaction zone is increased. This results in more catalyst being present in the reaction zone for the same volume of oil charged thereto. Since the temperature within the regeneration zone under normal operations is considerably higher than the temperature within the reaction zone, an increase in the rate of circulation of catalyst from the regeneration zone to the reaction zone results in an increase in the reaction zone temperature.

The chemical composition and structure of the feed to an FCC unit will affect the amount of coke deposited upon the catalyst in the reaction zone. Normally, the higher the molecular weight, Conradson carbon, heptane insolubles, and carbon-to-hydrogen ratio of the feedstock, the higher will be the coke level on the spent catalyst. Also, high levels of combined nitrogen, such as found in shale-derived oils, will increase the coke level on spent catalyst. Processing of heavier feedstocks, such as deasphalted oils or atmospheric bottoms from a crude oil fractionation unit (commonly referred to as reduced crude) results in an increase in some or all of these factors and therefore causes an increase in the coke level on spent catalyst. As used herein, the term "spent catalyst" is intended to indicate catalyst employed in the reaction zone which is being transferred to the regeneration zone for the removal of coke deposits. The term is not intended to be indicative of a total lack of catalytic activity by the catalyst particles. The term "used catalyst" is intended to have the same meaning as the term "spent catalyst".

The reaction zone, which is normally referred to as a "riser" due to the widespread use of a vertical tubular conduit, is maintained at high temperature conditions which generally include a temperature above about 797° F. (425° C.). Preferably, the reaction zone is maintained at cracking conditions which include a temperature of from about 896° to 1094° F. (480° to about 590° C.) and a pressure of from about 9.4 to 72.5 psia (65 to 500 kPa) but preferably less than about 39.9 psia (275 kPa). The catalyst-to-oil ratio, based on the weight of catalyst and feed hydrocarbons entering the bottom of the riser, may range up to 20:1 but is preferably between about 4:1 and about 10:1. Hydrogen is not normally added to the riser, although hydrogen addition is known in the art. On occasion, steam may be passed into the riser. The average residence time of catalyst in the riser is preferably less than about 5 seconds. The type of catalyst employed in the process may be chosen from a variety of commercially available catalysts. A catalyst comprising a zeolite base material is preferred, but the older style amorphous catalyst can be used if desired. Further information on the operation of FCC reaction zones may be obtained from U.S. Pat. Nos. 4,541,922, 4,541,923 and the patents cited above.

In an FCC process, catalyst is continuously circulated from the reaction zone to the regeneration zone and then again to the reaction zone. The catalyst therefore acts as a vehicle for the transfer of heat from zone to zone as well as providing the necessary catalytic activity. Any FCC catalyst can be used for the process. The particles will typically have a size of less than 100 microns. Catalyst which is being withdrawn from the regeneration zone is referred to as "regenerated" catalyst. As previously described, the catalyst charged to the regeneration zone is brought into contact with an oxygen-containing gas such as air or oxygen-enriched air under conditions which result in combustion of the coke. This results in an increase in the temperature of the catalyst and the generation of a large amount of hot gas which is removed from the regeneration zone as a gas stream referred to as a flue gas stream. The regeneration zone is normally operated at a temperature of from about 1112° F. (600° C.) to about 1472° F. (800° C.). Additional information on the operation of FCC reaction and regeneration zones may be obtained from U.S. Pat. Nos. 4,431,749, 4,419,221 (cited above) and U.S. Pat. No. 4,220,623.

The catalyst regeneration zone is preferably operated at a pressure of from about 5.1 to 72.5 psia (35 to 500 kPa). The spent catalyst being charged to the regeneration zone may contain from about 0.2 to about 15 wt-% coke. This coke is predominantly comprised of carbon and can contain from about 3 to 15 wt-% hydrogen, as well as sulfur and other elements. The oxidation of coke will produce the common combustion products: carbon dioxide, carbon monoxide, and water. As known to those skilled in the art, the regeneration zone may take several configurations, with regeneration being performed in one or more stages. Further variety is possible due to the fact that regeneration may be accomplished with the fluidized catalyst being present as either a dilute phase or a dense phase within the regeneration zone. The term "dilute phase" is intended to indicate a catalyst/gas mixture having a density of less than 18.7 lb/ft$^3$ (300 kg/m$^3$). In a similar manner, the term "dense phase" is intended to mean that the catalyst/gas mixture has a density equal to or more than 18.7 lb/ft$^3$ (300 kg/m$^3$). Representative dilute phase operating conditions often include a catalyst/gas mixture having a density of about 0.9 to 9.4 lb/ft$^3$ (15 to 150 kg/m$^3$).

FIG. 1 shows a stacked FCC configuration to which the method of this invention may be applied. The stacked FCC arrangement represents only one of many FCC arrangements to which this invention can be applied. Looking then at FIG. 1, a traditional stacked FCC arrangement will have a regeneration vessel 10, a reactor or upper vessel 12, and a stripping or side vessel 14. A regenerated catalyst conduit 16 transfers catalyst from the regenerator through a control valve 23 and into a lower riser conduit 20 where it contacts hydrocarbon feed entering the riser through hydrocarbon feed conduit 18. Conduit 18 may also contain a fluidizing medium such as steam which is added with the feed. Expanding gases from the feed and fluidizing medium convey catalyst up the riser and into riser conduit 22. As the catalyst and feed pass up to the riser, the hydrocarbon feed cracks to lower boiling hydrocarbon products.

Riser 22 discharges the catalyst and hydrocarbon mixture through riser outlets 44 to effect an initial disengagement of catalyst and hydrocarbon vapors. A majority of the hydrocarbon vapors continue to move upwardly into the inlet of cyclone separator 46 which effects a near complete removal of catalyst from hydrocarbon vapors. Separated hydrocarbon vapors exit reactor 12 through an overhead conduit 48 while a discharge leg 50 returns separated catalyst to a lower portion of the reactor vessel. Catalyst from riser outlets 44 and discharge leg 50 collects in a lower portion of the reactor and supplies catalyst to stripping vessel 14.

Steam enters stripping vessel 14 through an inlet provided by a conduit 54 and rises counter-current to a downward flow of catalyst through the stripping vessel thereby removing adsorbed hydrocarbons from the catalyst which flow upwardly through and are ultimately recovered with the steam by cyclone separator 46. In order to facilitate hydrocarbon removal, a series of downwardly sloping baffles 56 are provided in the stripping vessel 14. A spent catalyst conduit 58 removes catalyst from a lower conical section 60 of stripping vessel 14. A control valve 61 regulates the flow of catalyst from conduit 58.

Regeneration gas, such as compressed air, enters regenerator 10 through a conduit 30. An air distributor 28 disperses air over the cross-section of regenerator 10 where it contacts spent catalyst. Coke is removed from the catalyst by combustion with oxygen from distributor 28. Combustion by-products and unreacted air components rise upwardly along with entrained catalyst through the regenerator into the inlets of cyclones 26. Relatively catalyst-free gas collects in an internal chamber 38 which communicates with a gas conduit 40 and removing spent regeneration gas from the regenerator. Catalyst, separated by the cyclones, drops from the separators through discharge legs 42 and returns to a bed (not shown) in the lower portion of regenerator 10.

Figure 2:
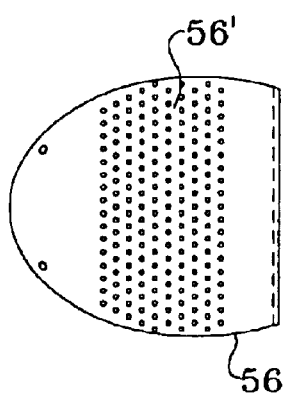
FIG. 2 is a horizontal section taken across the stripper of FIG. 1.

FIG. 2 shows a stripping baffle 56 having the greatest extent of hole distribution known to have been previously practiced in a sloped baffle-type stripper. This hole pattern was used in a stripper having a diameter of about 4.5 feet (1.4 meters) and a centralized distribution 56' of approximately 160 holes over ten rows arranged in a uniform triangular pitch. The relatively narrow band over which the large number of holes was centralized is only about equal in width to the nominal radius of the stripping vessel. Thus, even when the largest number of holes were provided, large areas of unperforated sections still exist over the sloped surface. For example, the lower portion of the sloped surface is unperforated in approximately a 10 inch (25 cm) length from the first row of holes towards the bottom edge of the baffle. This still leaves an area of over 3 ft$^2$ (0.279 m$^2$) at the bottom of the baffle without any perforations and an even greater area without perforations at the top of the baffle.

Figure 3:
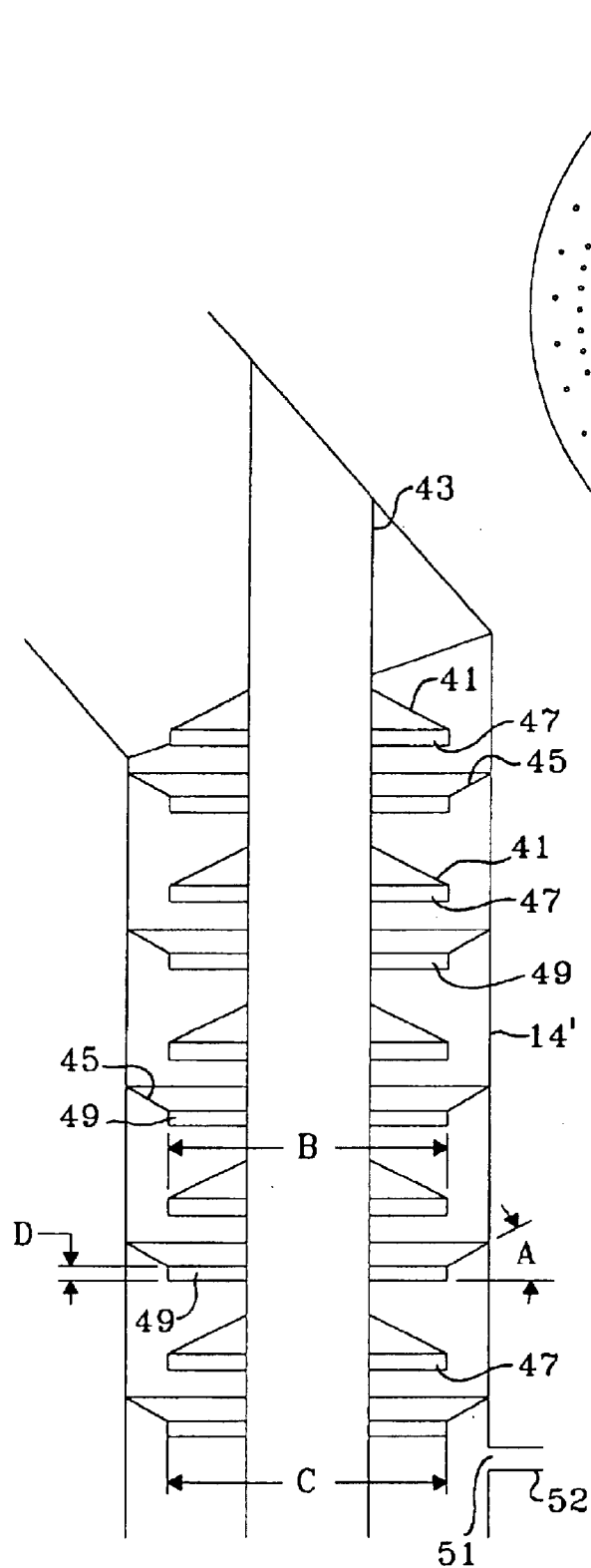
FIG. 3 shows a modified stripper arrangement for replacement of the stripper shown in FIG. 1.

FIG. 3 shows a series of stripper baffles arranged in accordance with this invention for replacement of the baffles shown in FIGS. 1 and 2. As opposed to the baffles 56, shown in FIG. 1, which extend from opposite sides of the stripping vessel 14, the internal baffle arrangement of a stripper 14' uses the more common annular arrangement of sloped baffles. While the annular-type sloped baffles are preferred, side-to-side baffles as shown in FIGS. 1 and 2 may also be employed in this invention. The sloped baffles have a generally annular projection across the transverse cross-section of stripper 14'. Inner baffles 41 extend outwardly from a central support conduit 43 that finds support from the top of stripper vessel 14'. Outer baffles 45 extend inwardly from the outer wall of stripping vessel 14'. The baffles extend down the vertical length of stripper 14' for a substantial portion of its vertical length. Increased stripper performance is usually obtained with an increased number of baffles. The available length of the stripper for layout configurations or other equipment constraints may limit the number of baffles that may be incorporated into the stripper. The annular baffle configuration is generally preferred since it will maximize the number of baffles which may be located within the stripping vessel. Additional baffles represent additional stages of stripping and most strippers will usually have a minimum of seven baffles overall. Spacing between the baffles must provide sufficient flow area for cascading movement of the catalyst around the inner and outer baffles. Providing a slope to the projecting baffle surface ensures movement of the catalyst across the baffle surface. Generally, the baffles will have an angle of inclination A to the horizontal of between 30° and 45°. Shallower angles of the baffles have the advantage of further maximizing the number of baffles that may be located in a given stripper length and providing less differential in the pressure head between the holes closer to the edge and the holes closer to the wall to which the baffle is attached. Moreover, a 30° angle gives more uniform jet velocity than a 45° angle because holes farther from the edge have a lower elevation and a greater pressure head. A baffle angle of 0° may be better than a baffle angle of 30°. However, as the baffle angle becomes more shallow catalyst has a greater tendency to accumulate on the baffle and the aeration of catalyst on the baffle becomes more critical. Hence, baffles with shallower angles must be provided with greater hole density to maintain fluidization of the catalyst for a given catalyst flux. Setting the angle of inclination of the baffles at 30° provides a good compromise between the competing considerations. However, the advantages of this invention may still be obtained through the use of horizontal baffles which gives the most uniform jet velocity but also requires the greatest hole density.

The outer diameter B of the inner baffles 41 and the inner diameter C of the outer baffles 45 are sized to facilitate construction of the stripper internals and to balance catalyst flow areas. Accordingly, dimensions B and C are ordinarily set so that the transverse projection of the inner and outer baffles cover approximately an equal area. Maintaining outer diameter B slightly smaller than inner diameter C permits insertion of conduit 43 with inner baffles 41 assembled thereon so that there is adequate clearance for the installation of both the inner and outer baffles. The difference in diameters B and C is kept relatively small and it is preferable that each baffle covers at least one-third of the total transverse annular flow area of stripper 14'. Preferably, the combined transverse projection of the inner and outer baffles will have a projection that substantially covers the annular cross-section of the stripper.

Inner baffles 41 and outer baffles 45 each show vertical skirts 47 and 49, respectively, depending from the lowermost edge of the sloped baffle surface. The vertical skirt section can serve a variety of purposes. The skirt has a length D which may vary from a minimal amount necessary to provide structural stability to the edge of the baffle to longer calculated lengths to provide a desired increase in the pressure drop across the holes in the sloped portion of the baffle. In this regard, as a stripping medium rises from an inlet 51 provided by a conduit 52, it passes first to the underside of the lowermost baffle and displaces catalyst from the volume underneath the baffle. Displacement of catalyst from the underside of the baffle by the entering stripping medium will continue until the volumetric discharge of stripping medium through the perforations exceeds the addition of stripping medium. For subsequently higher baffles the discharge of stripping medium and displaced vapors through the perforations equals the rate at which gas continues to flow into the bottom of the baffle. Where the stripping medium, or a stripping medium and displaced vapors, exceeds the volumetric discharge of gas across the openings in the baffles, the entering gas will displace catalyst from the entire volume beneath the baffle with any excess gas passing under the baffle or skirt if so provided. Accordingly, the pressure differential across any particular perforation is equal to the density of the catalyst multiplied by the elevation of the hole relative to the level of catalyst beneath that hole or perforation. Accordingly, increasing the length of the skirt can raise the pressure drop across individual perforations.

An important feature of this invention is the distribution of the battle openings over the entire sloped area of the baffles. The spacing of the perforations over the sloped area may be arranged in any manner that eliminates wide bands or areas that do not contain holes for delivery of the fluidization medium. The hole distribution most beneficial to this invention can be described by a limitation on the maximum circular area that must contain at least one opening. Generally, any circular area of at least 1 ft$^2$ (0.09 m$^2$) must surround at least a portion of one or more openings in that area. The circular area that can be circumscribed without enclosing a hole will usually not exceed 0.5 ft$^2$ (0.05 m$^2$). Following this type of criteria for the minimum geometry of an area that must contain a perforation will eliminate any large unperforated areas from the baffles. The spacing shown in FIG. 4 uses two rings of holes with the rings spaced approximately equally over the annular width of the sloped outer baffle 45. Inner ring 53 has approximately 72 holes equally spaced holes. Outer ring 55 has approximately 36 equally spaced holes. Each ring of holes 53 and 55 is approximately 3 inches (7.6 cm) from the nearest edge of the baffle and the adjacent row of holes. In an annular baffle arrangement, the largest spacing between the openings on the baffles is likely to occur in the outermost row of holes due to the increasing diameter of the baffle and especially in view of the increased pressure drop at the outer ring of openings which would require reduction in the total open area provided by the openings to obtain a uniform volumetric distribution of gas over the entire sloped surface.

Figure 5:
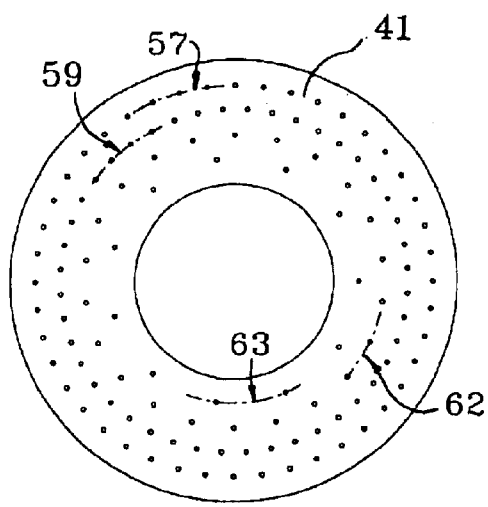
FIG. 5 is a plan view of an inner annular baffle from FIG. 3.

With respect to the inner baffles 41, the decreasing diameter of the baffle surface with increasing elevation promotes a more uniform distribution of the openings over the entire baffle surface. FIG. 5 shows such an arrangement where four rings of openings 57, 59, 62, and 63 contain 44, 44, 22, and 11 holes, respectively. Accordingly, the spacing between the openings in the first two rows are approximately the same and the spacing between the different rings of openings varies from about 3 inches (7.6 cm) at the bottom to approximately 8.25 inches (21 cm) at the top. The objective in spacing the openings is not so much to establish uniform distances but to have openings on lower rows that lie intermediate the openings in upper rows and thereby eliminate extended flow paths across the baffle that could permit catalyst to bypass the stripping medium. When the number of holes in a particular ring of openings becomes excessive, different diameters may be used relative to the upper holes to provide additional open area without increasing the number of holes.

The holes may be formed by simply drilling holes through the base material of the baffle. The baffles are typically formed from alloy steels that will stand up to the high temperature conditions in the reaction zone. Such steels are often subject to erosion and the baffles may benefit from the use of inserts or nozzles to define the openings and provide resistance to the erosive conditions imposed by the circulation of catalyst over the top of the baffle. Furthermore, the baffles are routinely covered with a refractory material that provides additional erosion resistance. Details of abrasion-resistant nozzles and refractory linings are well known to those skilled in the art of particle transport.

Figure 4:
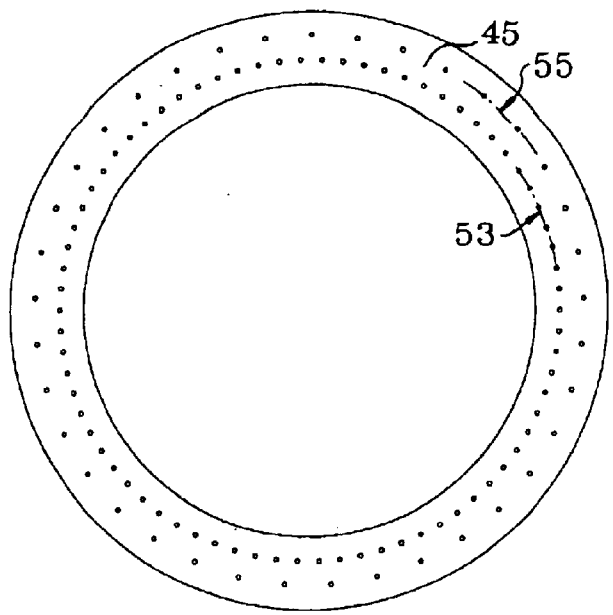
FIG. 4 is a section showing the arrangement of an outer annular baffle from FIG. 3.
Figure 6:
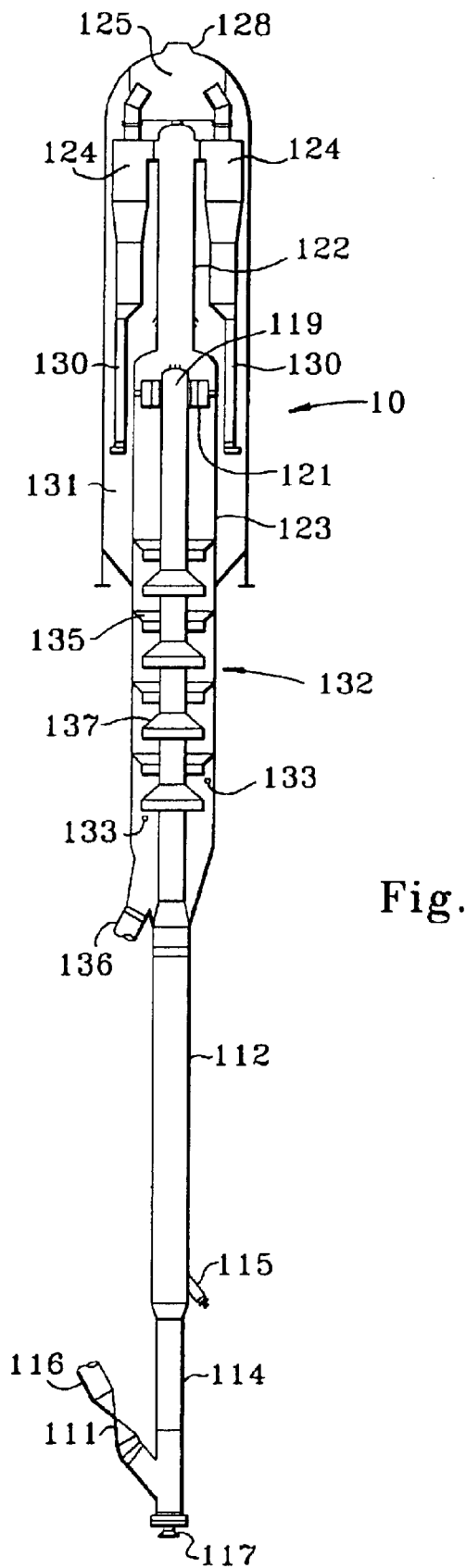
FIG. 6 is a sectional elevation view of an alternate arrangement for an FCC reactor.

FIGS. 3–5 show an arrangement of this invention for a relatively small stripper that is commonly found on older style stacked units. FIG. 6 shows a more modern FCC configuration that uses a concentric riser and stripper.

The reactor arrangement 10 in FIG. 6 operates in essentially the same manner as the reactor and riser shown in FIG. 1. A regenerator standpipe 116 transfers catalyst from a regenerator (not shown) at a rate regulated by a slide valve 111. A fluidization medium from nozzle 117 transports catalyst upwardly through a lower riser portion 114 at a relatively high density until a plurality of feed injection nozzles 115 (only one is shown) inject feed across the flowing stream of catalyst particles. The resulting mixture continues upward through an upper riser 112 until a pair of disengaging arms 121 tangentially discharge the mixture of gas and catalyst from a top 119 of the riser into a disengaging chamber 123 that effects separation of gases from the catalyst. A transport conduit 122 carries the hydrocarbon vapors and entrained catalyst to one or more cyclones 124 that separates spent catalyst from the hydrocarbon vapor stream. A collection chamber 125 gathers the separated hydrocarbon vapor streams from the cyclones for passage to an outlet nozzle 128 and into a fractionation zone (not shown). Diplegs 130 discharge catalyst from cyclones 124 into a lower portion of a collection space 131 that eventually passes the catalyst and adsorbed or entrained hydrocarbons into stripper zone 132 across ports (not shown) defined by the bottom of disengaging chamber 123. Catalyst separated in disengaging chamber 123 passes directly into stripper zone 132. The stripping gas enters a lower portion of the stripping zone 132 through an inlet 133. Inlet 133 may supply the stripping gas to one or more distributors (not shown) that distribute the gas around the circumference of the baffle. The spent catalyst leaves the stripping zone through a reactor conduit 136 and passes into the regeneration zone.

Figure 7:
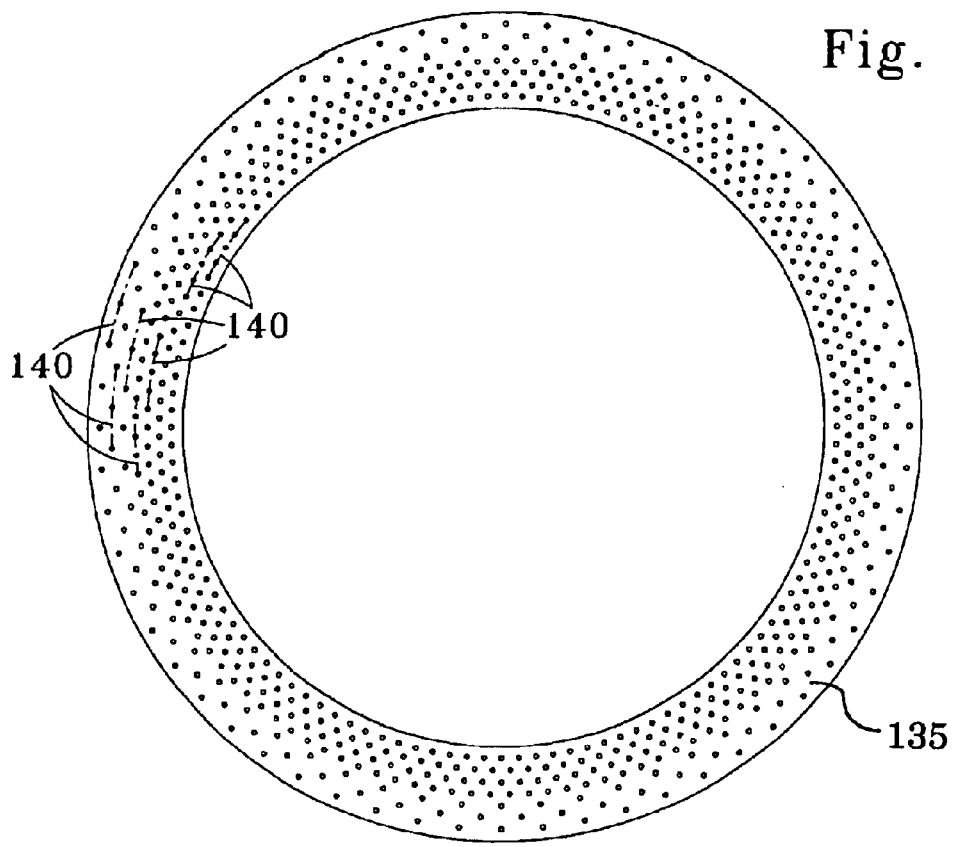
FIG. 7 is a plan view of an outer baffle from the stripper of FIG. 6.
Figure 8:
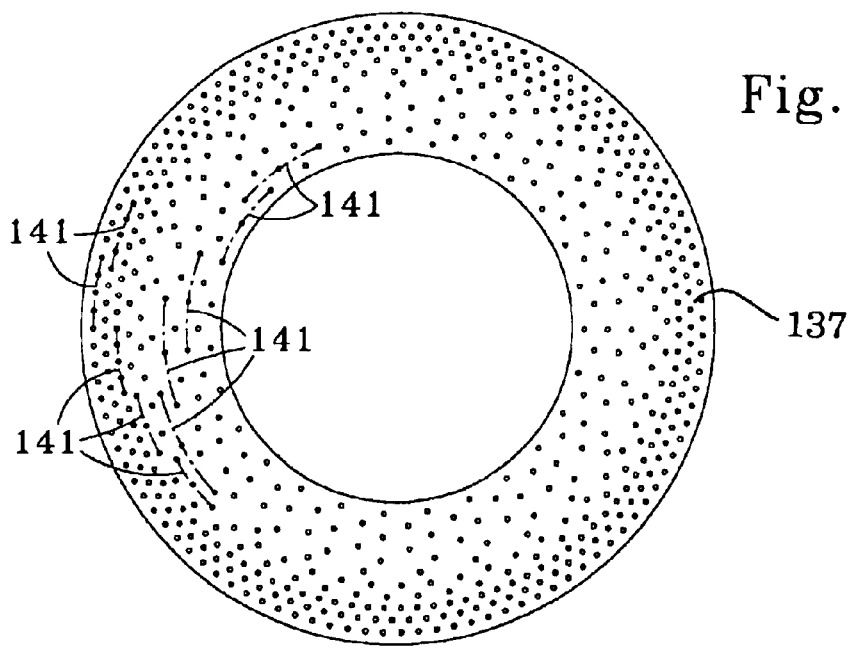
FIG. 8 is a plan view of an inner annular baffle from the stripper of FIG. 6.

As the catalyst passes through stripper 132, it contacts a series of outer baffles 135 and inner baffles 137. FIGS. 7 and 8 show a hole distribution for 0.38 inch (1 cm) holes for sloped baffles in a stripper that is more than three times larger than the stripper shown in FIG. 3. Each baffle contains over 600 holes but the hole distribution biases the distribution of holes toward the lower end of the sloped baffle surface. However, even in the uppermost rings of openings when the spacing between the holes is at a maximum, the maximum space in between intermediate holes on such large baffles is still only 7.5 inches (19.1 cm). Although the spacing of holes in individual rings may end up quite large, in this case, the maximum spacing occurs in the fifth ring of FIG. 8 and is almost 14 inches (35.6 cm), the spacing between rings of about 3 inches (7.6 cm) limits the effect of spacing or transverse flow path for catalyst to not more than about 7.5 inches (19.1 cm). FIG. 7 shows the distribution of the openings over seven rings 140 and FIG. 8 shows the distribution of the openings over eleven rings 141.

EXAMPLES 1 AND 2

A series of tests were conducted to more fully demonstrate the unique and unexpected change in stripper performance that results from a well-distributed pattern of perforations across a stripping baffle. The test apparatus was constructed from clear plastic panels to permit visual observation as well as measurement of stripper performance. The test apparatus modeled a 19° sector from a cylindrical stripper arrangement having a transverse cross-sectional area of about 2 ft² (0.19 m²). Inner and outer stripping baffles having a trapezoidal shape and a projected horizontal area of about 1 ft² (0.09 m²) were alternately placed at inner and outer locations of the apparatus to complete the model of a stripper sector. A total of three effective outer baffles and effective inner baffles were used with about a 38 inch (97 cm) spacing between adjacent outer baffles and between adjacent inner baffles. The leading edge of each baffle had a 3 inch (7.6 cm) vertical skirt. The apparatus had additional baffles that were used for distribution purposes but were not part of the effective stripping operation. Overall the apparatus had a height of about 20 feet (6 meters).

The test apparatus operated by circulating equilibrium FCC catalyst downwardly from a top inlet through the apparatus while air passed under the lowermost baffle upwardly through the baffles. The recovery of adsorbed hydrocarbons was simulated by injection of helium tracer into the circulating catalyst followed by measurement of the helium concentration in the recovered air. The stripped catalyst was recovered from the bottom of the test apparatus and the concentration was measured to determine the efficiency of the stripping operation. The air and helium along with entrained catalyst particle were recovered from the top of the apparatus and separated for recycle of the catalyst to the apparatus.

Example 1

The test apparatus measured the efficiency of a conventional baffle arrangement. The inner and outer baffles sloped downwardly at a 45° angle and had 15.5 inch (39.4 cm) holes arranged in two rows at the bottom of each baffle. The inner baffles contained a lowermost row of 8 holes spaced inwardly from the bottom of the baffle by a horizontal dimension of 2.5 inches (6.3 cm) with the next row of holes spaced horizontally inward by an additional 1.5 inches (3.8 cm). The outer baffles contained a lowermost row of 7 holes spaced inwardly from the bottom of the baffle by a horizontal dimension of 2.5 inches (6.3 cm) with the next row of holes spaced horizontally inward by an additional 1.5 inches (3.8 cm).

The test apparatus was operated over a range of flux conditions while varying the air rate to simulate an effective addition of steam at levels ranging from 1 to 3 lbs. per 1000 lbs. (1 to 3 kg per 1000 kg) of catalyst while a helium tracer was added. The measured decrease in the helium concentration at each flux rate and effective steam addition rate was measured. A reduction of 100% in the helium concentration would correspond to a complete stripping of the catalyst. The measured decrease in helium was used to calculate the stripping efficiency shown in the table for the rows designated as conventional baffles.

Example 2

The test apparatus measured the efficiency of a baffle arrangement that used the perforation arrangement of this invention in modified baffles. The arrangement of the test apparatus was the same as that as used in Example 1 except for the perforation pattern on the baffles. The inner baffles had 23.38 inch (59.4 cm) diameter holes arranged in four rows. A lowermost row of 7 holes was spaced horizontally 4 inches (10.2 cm) from the edge of the baffle. Succeeding rows of 7, 6, and 6 holes were spaced horizontally at intervals of 6.5 inches, 9 inches and 11 inches (16.5 cm, 22.9 cm and 27.9 cm), respectively, from the lower edge of the inner baffle. The outer baffles had 21.38 inch (54.3 cm) diameter holes arranged in rows of 8, 7, and 6 holes spaced at horizontal intervals of 4 inches, 6 inches and 8.5 inches (10.2 cm, 15.2 cm and 21.6 cm), respectively, from the lowermost edge of the baffle.

The test apparatus was again operated over a range of flux conditions while varying the air rate to simulate an effective addition of steam at levels ranging from 1 to 3 lbs. per 1000 per lbs. (1 to 3 kg per 1000 kg) of catalyst. Since the efficiency was found to increase with increasing flux rate, the apparatus with the modified baffles were operated at flux rates up to 140,000 lbs/hr/ft² (683,480 kg/hr/m²). The measured helium reduction at each flux rate and effective steam addition rate was used to calculate the efficiency shown in the table for the rows designated as modified baffles.

The results of the tests from Examples 1 and 2 are shown graphically in FIG. 9. Surprisingly, the test results show that the overall level of stripping efficiency increases with increasing catalyst flux through the stripper. This effect is directly opposite to the efficiency decrease shown by lower percent reductions in helium that occurs when flux is increased in the conventional stripping baffles. Therefore, the modified baffles of this invention show an unexpected increase in stripping efficiency without increasing the effective addition of stripping steam.

Example 3

Additional tests were run to show the effect of stripping baffle angle on the performance of the stripping efficiency. In this example the baffle angle was changed from 45° to 30° from the horizontal. The baffles were otherwise the same as Example 2 except for the change in baffle angle that was used. The tests were again run over a range of flux conditions while varying the air rate to simulate an effective addition of steam at levels ranging from 1 to 3 lbs. per 1000 lbs. (1 to 3 kg per 1000 kg) of catalyst. The table shows the efficiency at the different flux and effective steam rates and that at higher stripping steam rates the stripping efficiency again increases with higher flux rates.

Example 4

Additional tests were run to show the effect of further changes to the stripping baffle angle on the performance of the stripping efficiency. In this example the baffle angle was changed from 45° to 60° from the horizontal. Due to the increased baffle angle two baffles were removed. The baffles were otherwise the same as Example 2 except for the change in baffle angle and the fewer number of baffles. The tests were again run over a range of flux conditions while varying the air rate to simulate an effective addition of steam at levels ranging from 1 to 3 lbs. per 1000 lbs. (1 to 3 kg per 1000 kg) of catalyst. The table shows the efficiency at the different flux and effective steam rates and that a high stripping efficiency was obtained at high flux rates.

Example 5

A relative comparison was also performed to measure the relative effectiveness of a downcomer type stripping baffle against the modified baffle arrangement of this invention. The downcomer type baffles were the same as those used in Example 1 except for the addition of a row of two 2.5 inch (6.3 cm) diameter pipes to each of the baffles at a horizontal distance of about 10 inches (25.4 cm) from the lowermost edge of each baffle. The pipe placement on the row was staggered between vertically aligned baffles to empty catalyst on to a lower baffle surface and not directly into a subjacent pipe. The pipes were also positioned such that the their tops were flush with the highest intersection point of the baffle and the bottoms extended to a level that was about even with the top of the baffle skirt. The tests were again run over a range of flux conditions while varying the air rate to simulate an effective addition of steam at levels ranging from 1 to 3 lbs. per 1000 lbs. (1 to 3 kg per 1000 kg) of catalyst. The table shows that the addition of the downcomers produced a relative decrease in stripping efficiency as compared to the modified baffles, particularly at the higher flux rates.

STRIPPING EFFICIENCY

| Flux lbs/hr/ft$^2$ | Flux kg/hr/m$^2$ | Steam Rate lb/1000 lb (kg/1000 kg) | Conven. Baffle | Modified Baffle | Downcomer Baffle | 30° Baffle | 60° Baffle |
|---|---|---|---|---|---|---|---|
| 30,000 | 146,460 | 1.0 | 93.8 | 92.9 | 74.4 | 97.2 | 93.5 |
| 60,000 | 292,920 | 1.0 | 84.1 | 93.9 | 83.7 | 92.1 | 94.1 |
| 90,000 | 439,380 | 1.0 | 81.7 | 94.3 | 88.5 | 89.2 | — |
| 30,000 | 146,460 | 2.0 | 98.2 | 96.4 | 89.5 | 97.2 | 96.0 |
| 60,000 | 292,920 | 2.0 | 95.7 | 97.7 | 84.9 | 96.4 | 96.1 |
| 90,000 | 439,380 | 2.0 | 91.2 | 100.0 | 88.8 | 97.7 | 97.2 |
| 30,000 | 146,460 | 3.0 | 100.0 | 96.8 | 93.3 | 96.3 | 97.8 |
| 60,000 | 292,920 | 3.0 | 95.5 | 98.8 | 91.3 | 98.1 | 97.9 |
| 90,000 | 439,380 | 3.0 | 93.8 | 99.2 | 95.7 | 100.0 | 97.0 |
| 120,000 | 585,840 | 1.7 | | 97.8 | 87.7 | 97.6 | 97.0 |
| 140,000 | 683,480 | 1.5 | | 98.0 | 89.4 | 97.9 | 97.0 |

What is claimed is:

1. A process for the stripping of entrained and/or adsorbed hydrocarbons from particulate material, said process comprising:
   contacting particles with a hydrocarbon stream;
   disengaging hydrocarbons from the particles after contact with said hydrocarbon stream to produce a stream of contacted particles containing entrained or adsorbed hydrocarbons
   passing the contacted particles downwardly through a plurality of sloped stripping baffles;
   discharging a stripping fluid upwardly through a plurality of openings distributed over the entire sloped surface of each stripping baffle to provide at least one opening for each square foot (0.09 square meter) of the sloped surface of each baffle and stripping hydrocarbons from the particulate material;
   recovering stripping fluid and stripped hydrocarbons from the stripping baffles; and
   recovering stripped particles from the stripping baffles.

2. The process of claim 1 wherein the openings have a maximum dimension of 1.5 inches (3.8 cm) or less and the openings are located within 6 inches (15.2 cm) of the edge of any baffle.

3. The process of claim 1 wherein a lower portion of the sloped surface has a greater concentration of openings than an upper portion of the sloped surface.

4. The process of claim 1 wherein the openings are distributed to provide an essentially equal volumetric delivery of stripping fluid over the sloped surface.

5. The process of claim 1 wherein the openings are distributed to provide a greater volume delivery of stripping fluid to the lower portion of the sloped surface than to the upper portion of the sloped surface.

6. The process of claim 1 wherein subdivision of any portion of the sloped surface into a circular area of at least 1 ft$^2$ (0.09 m$^2$) will surround at least a portion of at least one opening in that area.

7. The process of claim 1 wherein each perforation on the sloped surface is within at least 8 inches (20.3 cm) of an adjacent perforation on the sloped surface.

8. The process of claim 1 wherein the process contacts particles comprising fluidized catalytic cracking (FCC) catalyst with hydrocarbons comprising an FCC feed and the FCC catalyst passes to a stripping zone containing said sloped stripping baffles wherein the FCC Catalyst passes counter-currently to the stripping fluid as said contacted particles.

9. The process of claim 1 wherein the flux rate through the stripper is at least 90,000 lbs/hr/ft$^2$ (439,380 kg/hr/m$^2$) of stripper area.

10. The process of claim 1 wherein the flux rate through the stripper is at least 140,000 lbs/hr/ft$^2$ (683,480 kg/hr/m$^2$) of stripper area.

11. The process of claim 1 wherein one of the sloped stripping baffles has an angle of inclination to the horizontal of 30°.

12. A process for the stripping of entrained and/or adsorbed hydrocarbons from particulate material, wherein the entrained or adsorbed hydrocarbons are from fluidized catalytic cracking (FCC) of an FCC feed with particulate material comprising an FCC catalyst, said process comprising:
    contacting an FCC feed with FCC catalyst to provide a mixture of FCC catalyst and FCC feed and to convert the FCC feed while depositing coke on the FCC catalyst;
    disengaging converted FCC feed from the FCC catalyst to produce a stream of disengaged catalyst particles containing entrained or adsorbed hydrocarbons;
    passing the disengaged catalyst particle stream into a stripping zone and passing the stream of catalyst particles downwardly through a plurality of vertically sloped stripping baffles in the stripping zone;
    discharging a stripping fluid upwardly through a plurality of openings distributed over the entire sloped surface of each stripping baffle to provide at least one opening for each square foot (0.09 square meter) of the sloped surface of each baffle and stripping hydrocarbons from the FCC catalyst;
    recovering stripping fluid and stipped hydrocarbons that pass upwardly from the stripping baffles;
    recovering stripped FCC catalyst that passes downwardly from the stripping baffles;
    passing stripped FCC catalyst to a regeneration zone to remove coke from the FCC catalyst; and
    returning FCC catalyst from the regeneration zone for contact with the FCC feed.

13. The process of claim 12 wherein the openings have a maximum dimension of 1.5 inches (3.8 cm) or less and openings are located within 6 inches (15.2 cm) of the edge of any baffle.

14. The process of claim 12 wherein a lower portion of the sloped surface has a greater concentration of openings than an upper portion of the sloped surface.

15. The process of claim 12 wherein the openings are distributed to provide an essentially equal volumetric delivery of stripping fluid over the sloped surface.

16. The process of claim 12 wherein the openings are distributed to provide a greater volume delivery of stripping fluid to the lower portion of the sloped surface than to the upper portion of the sloped surface.

17. The process of claim 12 wherein the flux rate through the stripper is at least 90,000 lbs/hr/ft$^2$ (439,380 kg/hr/m$^2$) of stripper area.

18. The process of claim 12 wherein the flux rate through the stripper is over 120,000 lbs/hr/ft$^2$ (585,840 kg/hr/m$^2$) of stripper area.

19. An apparatus for the stripping of entrained and/or adsorbed hydrocarbons from particulate material, said process comprising:
    a stripping vessel;
    at least one port defined by the stripping vessel for receiving particles that contain entrained or adsorbed hydrocarbons from the contact of the particles with a hydrocarbon stream and for withdrawing stripping fluid and stripped hydrocarbons from the stripping vessel;
    a plurality of sloped stripping baffles spaced apart vertically over at least a portion of the stripping vessel height with each baffle having a sloped surface and each sloped surface having a transverse projection equal to at least one-third of the minimum transverse cross-section of the stripping vessel at that baffle location;
    a plurality of openings distributed over the entire sloped surface of each stripping baffle to provide at least one opening for each square foot (0.09 square meter) of the sloped surface;
    at least one fluid inlet for passing a stripping fluid to the underside of at least one stripping baffle for stripping hydrocarbons from the particulate material; and
    at least one particle outlet for recovering stripped particles from the stripping baffles.

20. The apparatus of claim 19 wherein said at least one port comprises a single opening at the top of the stripping vessel for receiving particles and withdrawing stripping gas and stripping fluid.

21. The apparatus of claim 19 wherein a projection of the transverse cross-section from two adjacent sloped surfaces substantially covers the entire transverse cross-section of the stripping vessel.

22. The apparatus of claim 19 wherein at least three baffles occupy the stripping vessel and the slope of the baffles is from 30 to 45° from the horizontal.

23. The apparatus of claim 19 wherein the size of the openings does not exceed 1.5 inches (3.8 cm).

24. The apparatus of claim 19 wherein a vertical skirt extends downwardly from the bottom of the baffles.

25. The apparatus of claim 19 wherein a lower portion of the sloped surface has a greater concentration of openings than an upper portion of the sloped surface.

26. The apparatus of claim 19 wherein subdivision of any portion of the sloped surface into a circular area of at least 1 ft$^2$ (0.09 m$^2$) will surround at least a portion of at least one opening in that area.

27. The apparatus of claim 19 wherein perforations on the sloped surface are within at least 6 inches (15.2 cm) of an adjacent perforation on the sloped surface.

* * * * *